UNITED STATES PATENT OFFICE.

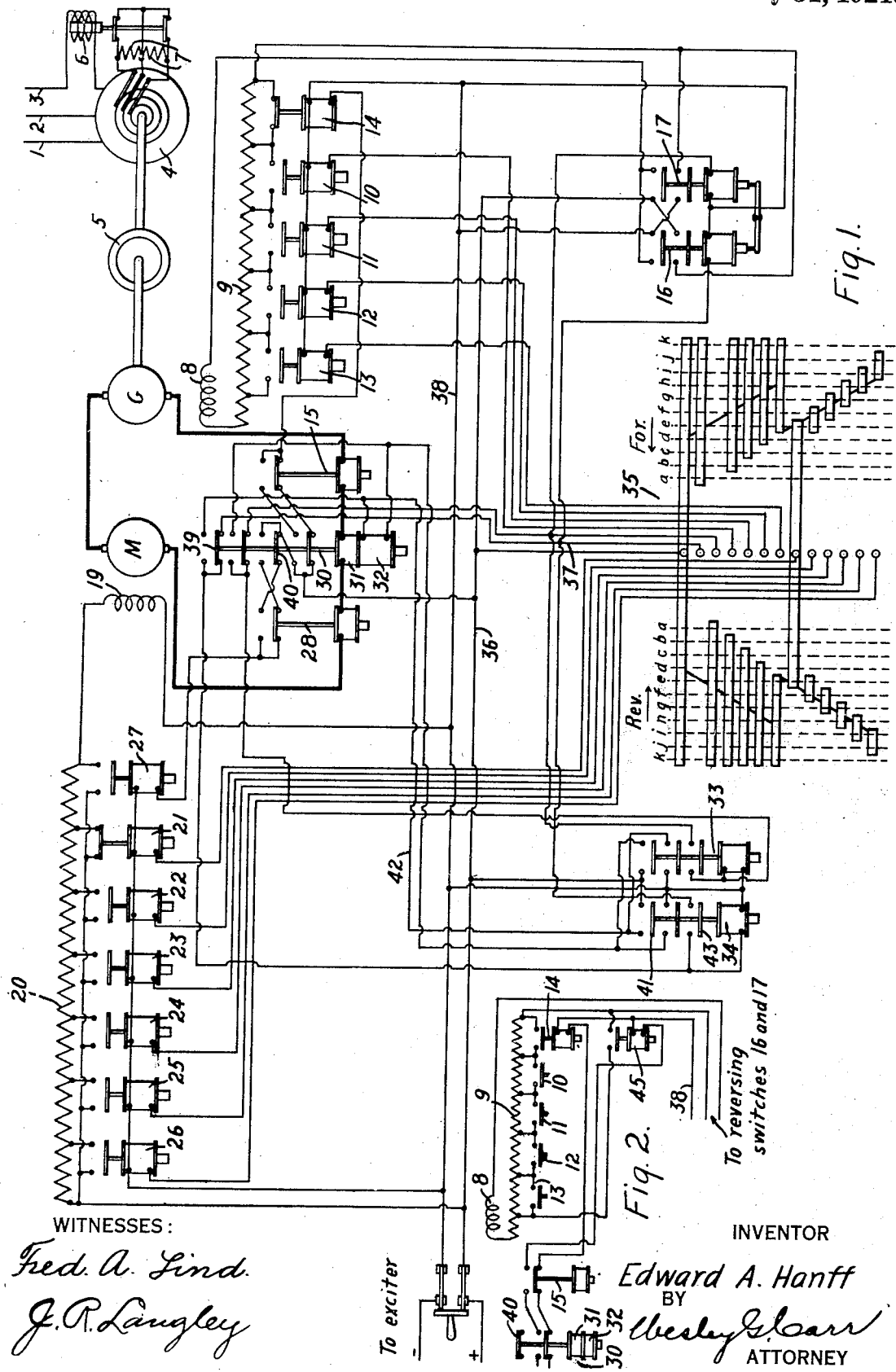

EDWARD A. HANFF, OF IRWIN, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,379,686.  Specification of Letters Patent.  Patented May 31, 1921.

Application filed November 22, 1916. Serial No. 132,795.

*To all whom it may concern:*

Be it known that I, EDWARD A. HANFF, a citizen of the United States, and a resident of Irwin, in the county of Westmoreland and State of Pennsylvania, have invented a new and useful Improvement in Electrical Systems, of which the following is a specification.

My invention relates to electrical systems and particularly to such systems as embody an electric generator and an electric motor that are permanently connected in a closed circuit.

My invention has for one of its objects to provide a simple arrangement whereby the field excitation of the generator and of the motor may be controlled automatically in accordance with conditions obtaining in the closed circuit comprising the generator and the motor armatures.

A second object of my invention is to provide means for energizing electromagnets for actuating automatic controlling means in accordance with the direction of the current traversing a closed circuit comprising a generator and a motor.

A further object of my invention is to provide means for automatically regulating the field excitation of an electric generator for supplying current to an electric motor permanently in circuit therewith independently of the operation of manually operable means during the deceleration of the motor.

My invention has particular relation to systems embodying a generator and a motor permanently connected in a closed circuit and in which the acceleration and deceleration of the motor are effected by varying the field excitation of the generator and of the motor. When a fly wheel is employed in connection with the means for actuating the generator in a system of the character described, the current generated by the motor, when the latter operates as a generator, may be utilized by the operation of the generator as a motor to store energy in the fly wheel. The energy stored in the fly wheel assists the driving motor for the generator when the demands of the working motor upon the generator are excessive.

In the operation of systems of the character indicated above, it is essential that means be provided for preventing such variations in the field excitation of the generator and of the motor supplied by it as cause excessive currents to traverse the closed circuit comprising their respective armatures. Since such systems must operate in reverse directions, it is essential, also, that the means for automatically controlling the field excitation of the respective machines be arranged for operation in such manner as to produce like effects under similar conditions during the operation of the motor in the respective directions.

In accordance with my invention, fluttering relays operate to control the field excitation of the generator and of the motor in accordance with the value of the current traversing the main circuit. The effects produced by the operation of the fluttering relays are reversed by the operation of a reverse-current relay which occupies the one or the other of two positions, depending upon the direction of current in the main circuit. Means are provided for reversing the conections of one of the actuating coils of the reverse-current relay in order that the latter may operate in the same manner for deceleration of the motor, regardless of whether it operates in the forward or in the reverse direction.

During deceleration of the motor, or regenerative braking, the field excitation of the generator is automatically maintained at a relatively high degree, regardless of the position of the master controller. This arrangement insures that an excessive current cannot traverse the main circuit when the motor operates as a generator and the generator operates as a motor to store energy in the fly wheel. Such arrangement is desirable because the fly wheel accelerates very slowly because of its relatively high inertia.

In the accompanying drawing, Figure 1 is a diagrammatic view of circuits and apparatus embodying my invention. Fig. 2 is a view, similar to Fig. 1, of a portion of a modification.

Line conductors 1, 2 and 3, which may be connected to any suitable source of alternating current, supply energy to an electric motor 4. The motor 4 is directly connected to a fly wheel 5 and to a generator G. The armature of the generator G and the armature of a motor M are permanently connected in a closed circuit.

The secondary circuit of the motor 4 is controlled by an electromagnetic switch 6 which operates to insert resistors 7 in circuit with the rotor windings when the current supplied to the motor exceeds a predetermined value. The generator G has a field-magnet winding 8 that is connected to any suitable source of constant voltage. A sectional resistor 9 is controlled by a series of successively operated electromagnetic switches 10, 11, 12 and 13. One section of the resistor 9 is controlled by an electromagnetic switch 14 that is controlled in accordance with the position of a relay 15 of the well known fluttering type. The connections of the field-magnet winding 8 are controlled by a pair of electromagnetic switches 16 and 17.

The motor M has a field-magnet winding 19 that is also connected to a source of substantially constant voltage. A sectional resistor 20 is controlled by a series of electromagnetic switches 21, 22, 23, 24, 25 and 26. An electromagnetic switch 27 controls a shunt circuit for the entire resistor 20 in accordance with the position of a fluttering relay 28 having an actuating coil in circuit with the generator and the motor armatures.

The respective effects produced by the operation of fluttering relays 15 and 28 are reversed by the operation of a reverse-current relay 30 having a series actuating coil 31 connected in the main circuit and a shunt actuating coil 32 that is connected to the exciter circuit. Since the current traversing the series actuating coil is reversed for operation of the motor in reverse directions, it is essential that the connections of the shunt coil be reversed in order that the relay 30 shall occupy the same position for the normal operation of the motor in the respective directions.

Reversing switches 33 and 34, which control the connections of the shunt actuating coil 32, are provided with actuating coils that are respectively energized in accordance with the adjustment of a master controller 35 to its forward or its reverse operating positions. The relay 30 accordingly occupies the same operative position during the acceleration of the motor in the one or the other direction and occupies its other operative position during deceleration of the motor while it rotates in the respective directions.

It may be assumed that the fly wheel 5 and the generator G are driven at a substantially normal speed by the motor 4. It may be assumed, also, that the controller 35 occupies its illustrated or "off" position in which the field-magnet winding of the generator G is deënergized. The major portion of the resistor 20 is shunted by the switch 21, the actuating coil of which is energized when the controller is in its "off" position. The resistor 9, with the exception of that portion which is controlled by switch 14, is in circuit with the field-magnet winding 8. The actuating coil of the switch 14 is normally energized by current from the exciter circuit.

To start the motor M in the forward direction, the controller 35 is actuated to the left, as viewed in the drawing. In position a of the controller, a circuit is completed which extends from conductor 36 which is connected to the positive terminal of the exciter, through controller 35, conductor 37 and actuating coil of switch 16, to conductor 38, which is connected to the negative terminal of the exciter. The switch 16 closes to complete a circuit for the field-magnet winding 8 which extends from conductor 36, through lower contact members of switch 16, resistor 9, field-magnet winding 8 and upper contact member of switch 16 to conductor 38.

A second circuit, which is also completed when the controller occupies its first operative position, extends from conductor 37 through contact member 39 of relay 30 and actuating coil of switch 34 to conductor 38. The switch 34 then closes to complete the circuit of shunt actuating coil 32 of relay 30 in such direction that its force opposes that of series actuating coil 31 during the normal operation of the motor M.

Inasmuch as the major portion of the resistor 20 is shunted and the larger portion of the resistor 9 is in circuit with the generator field-magnet winding, the motor has a strong field and the generator field is weak. A small current traverses the main or closed circuit comprising the motor and the generator armatures. The actuation of the controller to its successive operative positions b, c, d and e operates to effect the closing of switches 10, 11, 12 and 13, in order, to shunt the corresponding sections of the resistor 9 and thereby increase the field excitation of the generator G. The current traversing the main circuit increases to a corresponding degree and, if the controller has been actuated quickly to position e, this current may be excessive in value.

In this case, the relay 15 is actuated to its upper position to open the circuit of the actuating coil of switch 14. The latter opens to insert the section of resistor 9 controlled by it and thereby weaken the field excitation of the generator to a corresponding degree. When the current traversing the main circuit falls to the predetermined value at which the relay 15 operates, the latter returns to its illustrated position to again effect the closing of switch 14. The oscillations of relay 15 and switch 14 continue so long as the current in the main circuit exceeds the predetermined safe value. Under normal load conditions, no oscillation of the relay occurs when the motor has accelerated approximately to the speed corresponding to the adjustment of the master controller.

The adjustment of the controller to position $e$ effects the closing of a circuit comprising the actuating coil of switch 22 in anticipation of the opening of switch 21. The latter switch opens when the controller occupies position $f$. In the same manner, switches 23, 24, 25 and 26 are closed prior to the opening of the preceding switches in the series in order that the resistor 20 may be gradually inserted in series with the field-magnet winding 19.

In case the controller is actuated quickly to its final position and the field excitation of the motor is materially decreased, the current traversing the main circuit may become excessive. The relay 28 operates in the manner described in connection with relay 15 to control the circuit of the actuating coil of switch 27.

The latter closes a shunt circuit for the resistor 20 and the motor field is strengthened to reduce the current traversing the main circuit. The oscillations of the relay 28 and the switch 27 occur so long as the current in the main circuit exceeds the predetermined value. This condition occurs when the motor has reached its normal operating speed. It will be understood that the relay 28 operates simultaneously with relay 15 but no material variation of resistor 20 occurs until one or more of switches 21 to 26 have opened.

In case the motor M drives a variable load, the current supplied by the generator may, at times, be relatively heavy. Under these conditions, correspondingly heavy peaks occur in the demands of the alternating-current motor 4 upon the source from which it is supplied. When the current supplied to the motor 4 exceeds a predetermined value, the switch 6 opens to insert the resistors 7 in circuit with the secondary windings of the motor.

The speed of the motor 4 tends to decrease and the generator G is driven in part by the fly wheel 5. This arrangement insures that the peaks which would otherwise occur are materially reduced. The speeds of the fly wheel 5 and the generator G are gradually increased to the normal rates by the motor 4 during the normal operation of the system.

To stop the motor M, the controller 35 is actuated toward its "off" position. The switches 26, 25, 24, 23, 22 and 21 are closed in succession to gradually shunt the resistor 20 and thereby strengthen the field of the motor. The generator field is weakened by the opening of switches 13, 12, 11 and 10 to insert the resistor 9 in circuit with the field-magnet winding 8.

The motor now operates as a generator by reason of the change in conditions respecting the field excitation of the respective machines and, also, by reason of the fact that it operates at its normal running speed.

The closed circuit constitutes a dynamic braking circuit and the generator operates as a motor to store energy in the fly wheel 5.

Upon a reversal of the current in the main circuit, the coils 31 and 32 of reverse-current relay 30 assist each other to effect the actuation of the relay to its upper position to reverse the effects produced by the operation of the fluttering relays 15 and 28. A contact member 40 of relay 30 completes a circuit for the actuating coil of switch 27 and the latter closes to shunt the entire resistor 20. The circuit of the coil 14 is opened by the relay 30 at the same time, and the relay 14 opens to insert the resistor 9 into the circuit of the field-magnet winding 8. If the current traversing the main circuit during the deceleration of the motor becomes excessive, the relay 15 is actuated to its upper position to close the circuit of the actuating coil of switch 14 and the latter closes to shunt the section of resistor 9 controlled by it and thus correspondingly strengthen the field of the generator.

In the same manner, the relay 28 is actuated to its upper position to open the circuit of the actuating coil of switch 27 and thereby cause the latter to insert the resistor 20 in circuit with the field of the motor. The oscillations of the relays 15 and 28 and the switches respectively controlled by them continue until the speed of the motor has decreased to such rate that the current no longer exceeds the predetermined value.

When the relay 30 assumes its upper position upon the initial reversal of the current in the main circuit, a circuit, which is completed by interlock 39 mechanically connected to the relay 30, extends from conductor 36, through interlock 41 of reversing switch 34, conductor 42, interlock 39 and actuating coil of switch 34 to conductor 38. This circuit constitutes a holding circuit for energizing the actuating coil of switch 34, thereby maintaining the closure of the latter switch during such time as the current traversing the main circuit is of such value as to retain the reverse-current relay 30 in its upper position.

A second circuit is completed when the relay 30 and the switch 34 occupy their respective upper positions. This circuit extends from conductor 36 through interlock 41, conductor 42, interlock 39, contact member 43 and actuating coil of reversing switch 16 to conductor 38. This arrangement insures that the field excitation of the generator will be maintained so long as an appreciable current traverses the main circuit in the reverse direction.

It will be noted that the master controller may be actuated from its normal running position to the "off" position without damage to the dynamo-electric machines, the circuits of which are controlled by it. The relays 15 and 28 operate to automatically control the excitation of the respective field-magnet windings in accordance with the value of the current traversing the closed circuit.

The switches for controlling the connections of the generator field-magnet windings and of the shunt actuating coil of the relay 30 are thus retained in their respective positions for normal operation of the motor until the current traversing the dynamic braking circuit has fallen to a predetermined value at which the several circuits may be safely opened. The opening of the circuits is effected by the relay 30 when the latter assumes its lower position.

The operation of the motor in the reverse direction corresponds, in every essential particular, to that described in connection with the operation in the forward direction, and a detailed description of the same is accordingly omitted. It may be briefly stated that, upon the actuation of the controller to its other position, the switch 17 closes to complete the connection of the generator field-magnet winding 8 in such manner that the polarity of the generator is reversed. The switch 33 is closed to reverse the connections of the shunt actuating coil 32 of relay 30.

Reference may now be had to Fig. 2, in which a modification of a portion of the arrangement of Fig. 1 is diagramatically illustrated. Similar reference numerals are employed to designate corresponding parts. The entire system embodying this form of my invention is not illustrated since the portion of the system not shown is identical with the corresponding portion of the system of Fig. 1. A switch 45 controls a shunt circuit for the larger portion of the resistor 9. The actuating coil of switch 45 is energized only when the relay 30 occupies its upper position and when the relay 15 is also actuated upwardly because of the excessive value of the current traversing the main circuit.

The switch 45 shunts a larger portion of the resistor 9 than is controlled by the switch 14 which oscillates during the acceleration of the motor. Inasmuch as the switch 45 is controlled automatically by the relays 30 and 15, a strong generator field is insured during deceleration, regardless of the position of the master controller.

By means of a system constructed in accordance with my invention, I am enabled to accelerate and decelerate an electric motor by employing currents of maximum safe values during the respective periods of acceleration and dynamic braking. The field excitation of the generator and of the motor may be controlled manually or, in case the manually operable means is adjusted by a quick movement to an intermediate or a final operative position, the field excitation of the respective dynamo-electric machines is controlled automatically in accordance with the value of the current traversing the armatures of the machines.

The automatic mechanism insures that like effects are produced under similar conditions when the motor is operating in the one or the other direction. It is impossible to reverse the polarity of the generator for reversing the direction of operation of the motor while the current traversing the main circuit, during the operation of the motor as a generator, exceeds a predetermined value. This result is accomplished entirely independently of the adjustment of the manually operable means for controlling the direction of rotation of the motor.

By means of this arrangement, the operator may throw the master switch from the position corresponding to full speed in one direction to that corresponding to full speed in the other direction and the reversal occurs automatically at the proper time. Such operation insures that the direction of operation may be changed with a minimum loss of time.

I claim as my invention:

1. In an electrical system, the combination with a motor and a source of current therefor, of a resistor for controlling the voltage of said source, means for normally short-circuiting said resistor, means for automatically breaking said short-circuit when said motor operates as a generator, and means for reëstablishing said short-circuit when the current of said motor rises above a predetermined value.

2. In an electrical system, the combination with a generator and a motor in circuit therewith, said generator having a field-magnet winding and a pair of resistors in circuit therewith, of manually operable means for controlling one of said resistors under normal conditions and a fluttering relay for controlling said other resistor when said motor operates as a generator.

3. In an electrical system, the combination with a generator and a motor in circuit therewith, of means for automatically controlling the value of the voltage of said generator in accordance with circuit conditions and for producing like effects when the motor is operated in the one or the other direction under similar conditions, said means comprising a current-limit device and means for reversing the effect of the operation of said device.

4. In an electrical system, the combination with a generator and a motor in circuit therewith, of means for automatically controlling the value of the voltage of said generator in accordance with circuit conditions and for producing like effects when the the motor is operated in the one or the other direction under similar conditions, said means comprising a current-limit device and means controlled in accordance with the direction of the current traversing the circuit of said motor for controlling the effect of the operation of said device.

5. In an electrical system, the combination with a generator and a motor in circuit therewith, of means for automatically controlling the value of the voltage of said generator in accordance with circuit conditions and for producing like effects when the motor is operated in the one or the other direction under similar conditions, said means comprising a fluttering relay, a reverse-current relay for controlling the effects of the operation of the fluttering relay and means for controlling the direction of the operation of said motor and the actuating means for the reverse-current relay.

6. In an electrical system, the combination with a generator and a motor in circuit therewith, said motor having a normally short-circuited field resistor, of means for inserting said resistor into the circuit of said motor and means dependent upon circuit conditions for automatically alternately short-circuiting said resistor and removing said short-circuit.

7. In an electrical system, the combination with a generator and a motor in circuit therewith, of fluttering relays for controlling the field excitation of said generator and of said motor in accordance with the current traversing their main circuits, means for reversing the effects produced by the operation of said relays and means for controlling the polarity of said generator.

8. In an electrical system, the combination with a generator and a motor in circuit therewith, of fluttering relays for controlling the field excitation of said generator and of said motor in accordance with the current traversing their main circuits, a reverse-current relay for controlling the effects produced by the operation of said fluttering relays, and means for varying the conditions under which the reverse-current relay operates.

9. In an electrical system, the combination with a generator and a motor in circuit therewith, of fluttering relays for controlling the field excitation of said generator and of said motor in accordance with the current traversing their main circuits, a reverse-current relay for reversing the effects produced by the fluttering relays when the motor is respectively accelerating or decelerating, and means for causing the said relays to produce like effects under similar conditions when the motor is operating in the one or the other direction.

10. In an electrical system, the combination with a generator and a motor in circuit therewith, of fluttering relays for controlling the field excitation of said generator and of said motor in accordance with the current traversing their main circuits, a reverse-current relay for reversing the effects produced by the fluttering relays when the motor is respectively accelerating or decelerating, and manually operable means for reversing the electrical connections of an actuating coil of said reverse-current relay.

11. In an electrical system, the combination with a generator and a motor in circuit therewith, of fluttering relays for controlling the field excitation of said generator and of said motor in accordance with the current traversing their main circuits, a reverse-current relay for reversing the effects produced by the fluttering relays when the motor is respectively accelerating or decelerating, and manually operable means for simultaneously effecting the reversal of the connections of an actuating coil of said reverse-current relay and the reversal of the polarity of said generator.

12. In a motor-control system, the combination with a dynamo-electric machine having a field-magnet winding, and a resistor in circuit therewith, of a pair of reversing switches for said winding each having an actuating coil, a pair of switches for controlling the circuits of said coils, means for closing said controlling switches and means controlled by the electrical conditions of said machine for maintaining said controlling switches closed.

13. In an electrical system, the combination with a generator having a field-magnet winding and a resistor in circuit therewith, of a switch for controlling the circuit of said winding, a second switch for controlling said first switch and a third switch energized in accordance with circuit conditions of said generator for controlling said second switch.

14. In an electrical system, the combination with a generator having a field-magnet winding and a resistor in circuit therewith, of a controller for said generator adapted to occupy an operative position and an inoperative position, means for establishing an exciting circuit for said field-magnet winding and short-circuiting said resistor when said controller occupies said operative position, and means for reinserting said resistor into circuit and for maintaining said circuit closed a predetermined length of time when said controller is moved to said inoperative position.

15. In an electrical system, the combination with a main circuit comprising the respective armatures of a generator and a motor, of reversing switches for controlling the field excitation of said generator, means comprising a reverse-current relay for controlling the value of the current traversing the main circuit under predetermined conditions, an actuating coil for said relay, means for reversing the connections of said coil and circuits controlled by said relay and said reversing means for retaining said reversing switches in an operative position while the current traversing the main circuit exceeds a predetermined value.

16. In a motor-control system, the combination with an electric circuit comprising a pair of dynamo-electric machines each having a resistor, one of said resistors being initially in circuit and the major portion of said other resistor being initially short-circuited, of means for short-circuiting said first resistor, means for inserting said second resistor into circuit and means for automatically returning one of said resistors to its said initial condition under predetermined conditions.

In testimony whereof I have hereunto subscribed my name this 8th day of Nov., 1916.

EDWARD A. HANFF.